Sept. 17, 1929.   H. H. HALL   1,728,407
PARKING DEVICE FOR AUTOMOBILES
Filed March 12, 1928   2 Sheets-Sheet 1

Inventor
Harvey H. Hall.
By A. J. O'Brien
Attorney

Sept. 17, 1929. H. H. HALL 1,728,407
PARKING DEVICE FOR AUTOMOBILES
Filed March 12, 1928   2 Sheets-Sheet 2
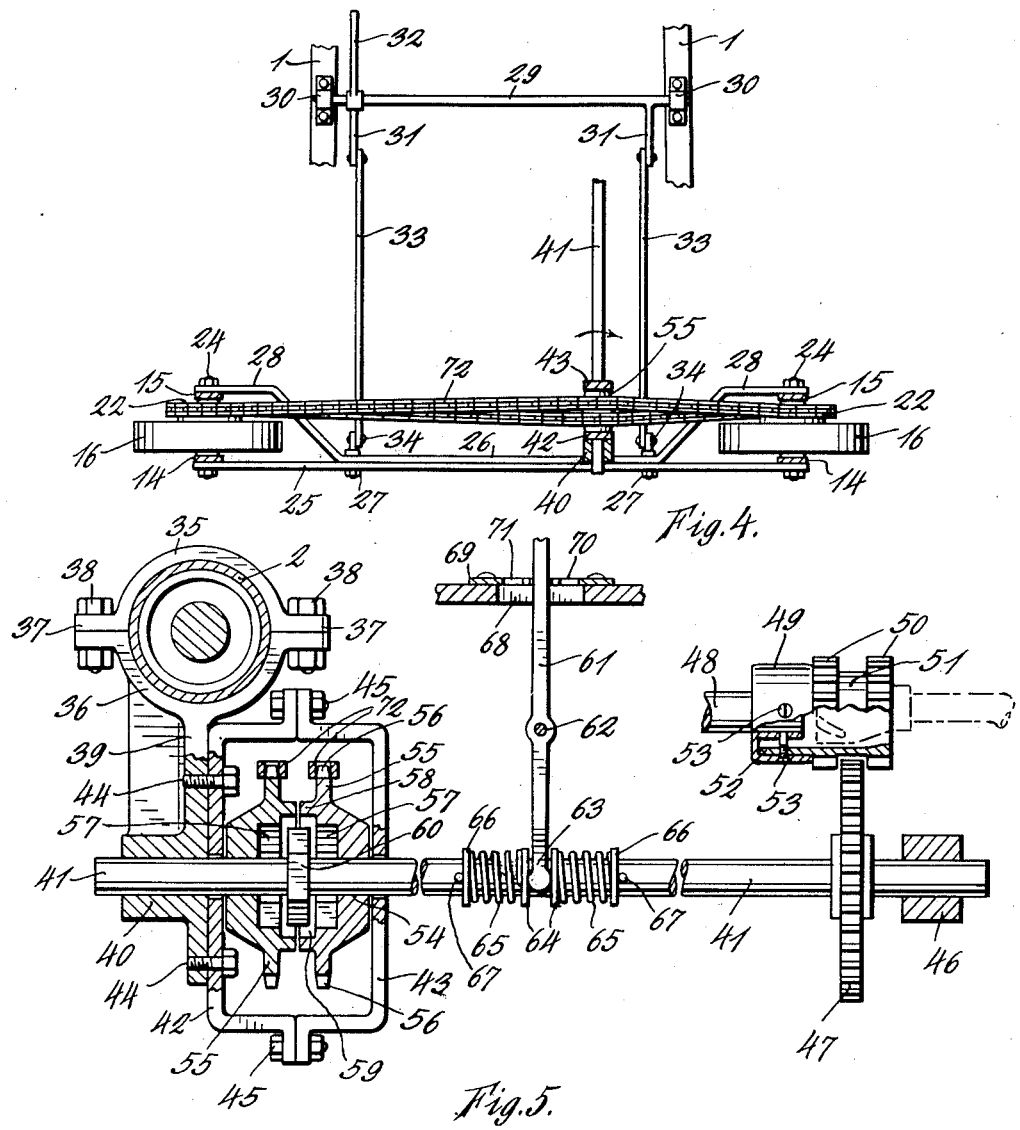
Inventor
Harvey H. Hall.

Patented Sept. 17, 1929

1,728,407

UNITED STATES PATENT OFFICE

HARVEY H. HALL, OF ARVADA, COLORADO

PARKING DEVICE FOR AUTOMOBILES

Application filed March 12, 1928. Serial No. 261,016.

This invention relates to improvements in devices for parking automobiles.

Since the number of automobiles in daily use have become so great the problem of parking has assumed a grave importance in all cities. As the ordinary city streets were not planned for the present day automobile traffic, and are not of any great width, it has been found that it is necessary to park cars parallel with the curb as in this way only can sufficient room be had in the middle of the street to permit the necessary traffic. With the ordinary automobile construction, parallel parking is quite difficult and necessitates a space of several feet between the automobiles. This waste of space diminishes the parking capacity and the difficulty in parking and leaving a parking space is quite great.

It is the object of this invention to produce a device that can be attached to any car of ordinary construction or can be built into the car when the latter is manufactured and by means of which it is possible to transport the car transversely so that it may be quickly moved into a parking space or removed therefrom.

This invention briefly described comprises a pair of wheels movably connected with the rear axle of the automobile and mounted for rotation about axes that are perpendicular to the rear axle of the automobile and which can be rotated by means of power derived from the automobile engine. Means is provided for bringing these wheels into contact with the ground and for raising the weight of the automobiles off the regular drive wheels onto the auxiliary wheels so that the automobile will be supported by the latter and can therefore be moved transversely in either direction.

In the example illustrated and which will be hereinafter described, these auxiliary wheels have been shown attached to the rear axle only, but a similar arrangement of transverse wheels can be attached to the front axle if desired.

Having thus briefly described the invention, the same will now be described in detail, and reference will be had to the accompanying drawings, in which one embodiment thereof has been illustrated, and in which:

Fig. 4 is a section taken on line 4—4, Fig. 2; and

Fig. 5 is a section taken on line 5—5, Fig. 2.

Figure 1:
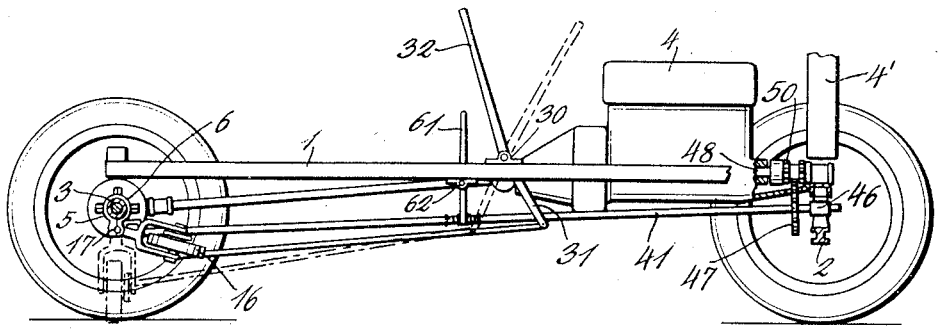
Fig. 1 is a side elevation of an automobile chassis with parts shown in section and with my improved parking device in place thereon.

In the drawing numeral 1 represents the side frame members of the automobile chassis frame, 2 the front axle, and 3 the rear axle. The internal combustion engine which furnishes the power has been designated by numeral 4, while numeral 4' represents the radiator. As this invention has nothing to do with improvements in the construction of the automobile itself, only such portions of the latter have been shown as cooperate with the parking device and which are necessary for a proper description of the latter.

Where this parking device is to be attached to an automobile, a pair of clamping devices are secured to the rear axle and each of these clamping devices consists of two clamping members 5 and 6. These clamping members have semicircular portions that embrace the axle housing and are provided at their upper ends with lugs 7 which are perforated for the reception of bolts 8. The lower ends of each member has a downwardly extending lug 9, which is perforated for the reception of the clamping bolts 10. Each lug 9 extends a short distance below the bolt 10 and is provided with notches 11 which receive the projecting portions 12 that extend upwardly from the upper end 13 of the wheel fork between the arms 14 and 15 of which the transverse wheels 16 are pivoted. The forks are connected to the clamping members by means of pins 17 about which they may be oscillated from the position shown in full lines to the position shown in dotted lines in Fig. 1. Attention is called to the fact that the projections 12 have their rear upper portions 18 square so as to form a stop that prevents the forks from being rotated rearwardly, while their front surfaces are curved in the manner indicated by numeral 19 so as to permit them to be moved forward to the full line position shown in Fig. 1.

Each of the wheels 16 is provided with a central hub 20, which, in the example shown, has a radially extending flange 21 to which a sprocket wheel 22 is secured by means of bolts 23. Wheels 16 are mounted for rotation on an axle 24. For the purpose of preventing lateral movement of the forks a transverse tie bar 25 has been provided and this extends from one of the forks to the other and is secured to the forks by means of bolts 24. A similar tie bar 26 connects the front branches 15 of the forks. The central portion of bar 26 is parallel with 25 and is secured to the latter by means of bolts 27, Fig. 4. The ends of bar 26 are offset and terminate in end portions 28 that are secured in place by means of the bolts 24.

For the purpose of oscillating the wheel supporting forks about their pivots 17, I have provided a bar 29 that extends transversely of the chassis frame and which has its ends journalled in boxes 30, which are secured to the side frame members 1. This bar has downwardly extending arms 31 and an upwardly extending lever 32. The lower ends of arms 31 are pivotally connected with rigid rods 33 whose rear ends are pivoted at 34 to the forwardly extending ends of the clamping bolts 27. When bar 29 is rotated about its axis, it will impart a corresponding movement to the wheel supporting forks and when the handle 32 is in the full line position shown in Fig. 1, the wheels 16 will also occupy the full line position, while the dotted line position of handle 32 corresponds with the dotted line position of wheels 16. It is evident that when the parts are in the position indicated by full lines in Fig. 1, that the transverse wheels will be held in such a position that they will in no way interfere with the operation of the automobile, and that when they are to be moved into operative or dotted line position, this can readily be accomplished by merely grasping the handle 32 and moving it forwardly to dotted line position. As it is necessary to raise the rear wheels from the road surface, it is obvious that a slight amount of force must be employed and this is accomplished by the lever action of handle 32. It is evident that when wheels 16 are moved from full line to dotted line position, Fig. 1, that the peripheries of these wheels will come in contact with the pavement surface before they reach the dotted line position and that any further rearward movement will raise the drive wheels upwardly and this of course requires a considerable amount of force which is supplied by the lever action of handle 32 and arms 31. When the peripheries of wheel 16 come in contact with the pavement surface, they will, of course, be stationary with respect to the ground and will therefore act as a fulcrum. Any force exerted to move handle 32 forwardly, will produce a force tending to move the automobile in a forward direction, and this force will raise the drive wheels from the ground. It is possible to move the transverse wheels into operative position very easily if the driver takes advantage of the momentum of the car and as soon as sufficient skill has been developed in the operation of this device, the driver is able to bring the parts into operative position very easily.

Having now explained the manner in which the transverse wheels are connected to the rear axle housing and the means employed for moving them into and out of operative position, I will now describe the mechanism by means of which the transverse wheels are rotated at will in either direction.

A clamp comprising clamping members 35 and 36 is secured to the rear axle housing to one side of the differential housing. Each of these clamping members has a semicircular surface which is adapted to fit against the axle housing and is provided with lugs 37 through which the clamping bolts 38 extend. Member 36 has a downwardly projecting portion 39, whose lower end is provided with a bearing 40 in which the rear end of a drive shaft 41 is slidably and rotatably mounted. A gear casing comprising parts 42 and 43 is secured to the downwardly extending member 39 by means of screws 44 and these two casing members are connected by means of clamping bolts 45.

The front end of shaft 41 is journalled in a bearing 46 that is secured to the front end of the chassis frame by any suitable means. A gear wheel 47 is rigidly secured to the front end of shaft 41 and this cooperates with a duplex gear that is secured to the front end of the crank shaft 48. In Fig. 5, numeral 49 represents the fan belt pulley that is ordinarily secured to the front end of the crank shaft and to this pulley I have attached a duplex gear consisting of two gears 50 which are separated by an open space 51. This duplex gear has a cylindrical portion 52 that extends rearwardly into the interior of the fan belt pulley and is secured to the latter by means of screws 53. When the parts are in assembled position, gear wheel 47 will normally occupy the position shown in Fig. 5 in which it is located in the space 51 between the two gears 50. When the parts are in this position, it is evident that the crank shaft and gears 50 can rotate freely without imparting any rotary motion to the gear 47.

Secured to the shaft 41 and located between the members 42 and 43, are two sprocket wheels. These sprocket wheels are of identical size and shape and each has a hub provided with an opening 54 through which the shaft 41 extends, and an outwardly extending flange 55 whose periphery is provided with ratchet teeth 56. Each of these sprocket wheels has a central recess 57 which is of hexagonal shape. Cylindrical flanges 58 extend from the adjacent sides of the sprocket wheels and cooperate to form a cylindrical recess 59 within which the hexagonal disk 60 is normally positioned. Disk 60 is rigidly secured to the shaft so that it can neither rotate nor slide thereon, and is of such size that it will fit the openings 57.

It is apparent that if shaft 41 is moved longitudinally in a forward direction, gear wheel 47 will be moved into mesh with the foremost gear 50, and at the same time the hexagonal disk 60 will move into the hexagonal recess 57. When in this position, shaft 41 will be rotated whenever the crank shaft 48 rotates and will impart a corresponding rotation to the foremost ratchet wheel 55, and in a similar way when the shaft is moved rearwardly the gear wheel 47 will be moved into mesh with the rearmost gear 50 and at the same time the hexagonal disk 60 will move into the hexagonal recess 57 of the rearmost ratchet wheel.

For the purpose of moving the shaft 41 longitudinally, I have provided a lever 61 which is pivoted at 62 in a bearing carried by the chassis frame. The lower end of this member is provided with a fork 63 that embraces the shaft and which is located between two washers 64. A helical compression spring 65 has one end abutting each washer 64 and the other end abutting a washer 66 that is held against longitudinal movement on the shaft 41 by means of a pin 67. The upper end of lever 61 extends through a slot 68 in the foot board and engages in either one of three notches in a plate 69 that is secured to the upper surface of the foot board. When the lever is in the central notch in the manner shown in Fig. 5, shaft 41 will be held in neutral position and when the lever is moved to either one of the notches 70 or 71, it will compress one of the springs 65 more than the other and will therefore produce an unbalance force that will move the shaft longitudinally. The reason why I employ springs 65 is that the gear teeth may not be in position to mesh at the instant the lever is moved and therefore by employing the springs, the lever can be quickly moved and will produce the necessary force to move the shaft as soon as the gear teeth or the disk 60 comes into the necessary rotary position to permit this movement.

Figure 2:
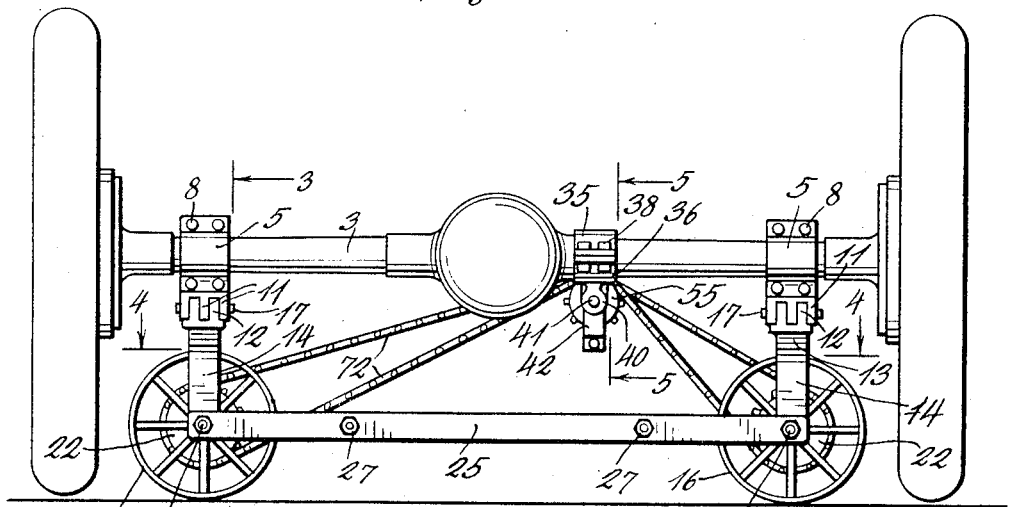
Fig. 2 is a rear view of an automobile rear axle showing my device in place thereon.
Figure 3:
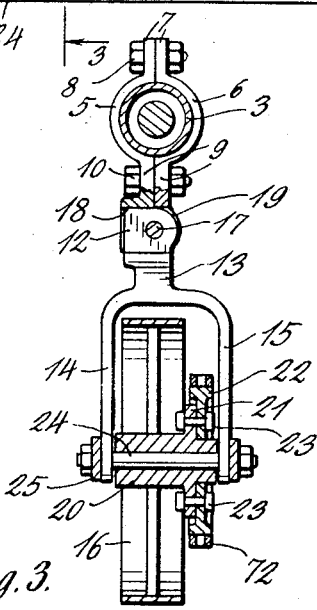
Fig. 3 is a section taken on line 3—3, Fig. 2.

For the purpose of rotating wheels 16 a sprocket chain 72 has been provided. This sprocket chain encircles the sprocket wheels 22 that are attached to the wheels and pass over the top of sprocket wheels 55. It will be observed from Fig. 4 that one of the sprocket wheels 55 is engaged by the upper part of chain 72 and the other by the lower part. In the example given shaft 41 rotates in the direction of the arrow in Fig. 4 or in a clockwise direction when viewed as in Fig. 2 and therefore when the hexagonal disk 60 is in engagement with the foremost sprocket wheel 55 the upper side of chain 72 will be moved from left to right, Fig. 2, and therefore the wheel 16 will be rotated in such a direction that they will move the rear end of the automobile towards the right. If the rearmost sprocket wheel 55 is connected to shaft 41, the lower side of the sprocket chain 72 will move from left to right and therefore the wheels 16 will be rotated in a counter clockwise direction in which direction the rear end of the automobile will be moved from right toward left. From the above it will be apparent therefore, that, by shifting the shaft 51 so as to engage one or the other of sprocket wheels 55, that the wheels 16 may be rotated in any direction desired. When the automobile is to be moved towards the curb, disk 60 engages the foremost sprocket wheel 55 and when the automobile is to be removed from the curb, disk 60 is connected with the rearmost sprocket wheel 55.

The apparatus above described is employed in the following manner in parking automobiles parallel with the curb. The driver heads his car into the space in which it is to be parked and places the right front wheel against the curb, he then shifts lever 61 into notch 71, and thereby moves gear 47 into mesh with the foremost gear 50 and at the same time moves the hexagonal disk 60 into engagement with the foremost sprocket wheel 45 whereupon wheels 16 will be rotated clockwise and will carry the rear end of the automobile towards the curb. When the rear end is in position as desired, lever 61 is moved into the central notch and the shaft returned to the position shown in Fig. 5. When the car is to be removed from the parking space, it may be removed by reversing the operation just described, bringing the rear end of the car outwardly and then backing the car so as to remove the front end from the parking space.

Although I have shown auxiliary wheels secured to the rear axle only, it is evident that by carrying forward this idea a similar arrangement can be attached to the front axle, and when this is done, the automobile can be moved transversely into and out of the parking space, thereby simplyfying and greatly facilitating the parking operation.

For ordinary use, however, it is considered, that the arrangement shown and described, is sufficient and that the more complicated arrangement showing the two sets of auxiliary parking wheels, is not necessary except in extreme cases.

I have shown the power take-off as connected with the front end of the crank shaft, but I want it understood that this power take-off can be located in any suitable position and if a more convenient arrangement can be found than the one shown, it can be used without departure from my invention.

Having described the invention what is claimed as new is:

1. In an automobile having an axle housing, a wheel secured to each end of the axle, and an engine, a clamp secured to each end of said housing, a wheel fork pivotally connected with each clamping member, means for interconnecting the forks, a wheel rotatably secured to each fork so as to rotate about an axis perpendicular to the axis of the axle housing, means for moving the forks about their pivots, a stop for limiting the movement of the forks about their pivots in one direction, a supporting member secured to the axle housing at a point between the clamps, said supporting member having a bearing, a drive shaft having one end journalled in the bearing, means for rotatably supporting the other end of the drive shaft, means for interconnecting the shaft and the engine so that the latter will rotate the former, means for interconnecting the shaft and the wheels carried by the forks for rotating the wheels and means for reversing the direction of rotation of the wheels without reversing the direction of rotation of the shaft.

2. In an automobile having an axle housing, a wheel secured to each end of the axle, and an engine, a clamp secured to each end of said housing, a wheel fork pivotally connected with each clamping member, means for interconnecting the forks, a wheel rotatably secured to each fork so as to rotate about an axis perpendicular to the axis of the axle housing, means for moving the forks about their pivots, and means for connecting the wheels with the engine so that they will be rotated thereby, a stop for limiting the movement of the forks about their pivots in one direction, two sprocket wheels rotatably connected with the shaft, a sprocket wheel connected with each wheel, a single endless sprocket chain connecting the four sprocket wheels and means for interconnecting either one of the sprocket wheels carried by the shaft, with the shaft so that it will be rotated thereby.

3. In an automobile having a rear axle housing, an engine and a crank shaft, a gear wheel secured to the engine so as to be rotated thereby, said gear having two gear rings separated by a space, a slidable shaft, a gear wheel secured to the shaft, means for normally holding the shaft in such a position that the gear wheel is in the space between the gear rings, means for shifting the shaft longitudinally, a pair of wheels secured to the axle housing so as to rotate in a plane parallel with the axis of the housing and means for rotating the wheels when the shaft is rotated.

4. A parking device for automobiles having a rear axle housing, a chassis frame and an engine comprising a clamp secured to the axle housing near each end thereof, a wheel fork pivoted to each clamp so as to be movable about a pivot parallel with the axis of the axle housing, a wheel rotatably secured to each fork, a shaft having one end slidably and rotatably secured to the axle housing, the other end being slidably and rotatably secured to a bearing connected with the engine, means for rotating the shaft when the engine rotates and means for transmitting power from the shaft to the wheels.

5. A parking device for automobiles having a rear axle housing, a chassis frame and an engine comprising a clamp secured to the axle housing near each end thereof, a wheel fork pivoted to each clamp so as to be movable about a pivot parallel with the axis of the axle housing, a wheel rotatably secured to each fork, a shaft having one end slidably and rotatably secured to the axle housing, the other end being slidably and rotatably secured to a bearing connected with the engine, means for rotating the shaft when the engine rotates, means for transmitting power from the shaft to the wheels and means for reversing the rotation of the shaft.

6. A parking device for automobiles having a rear axle housing, a chassis frame and an engine, comprising a clamp secured to the axle housing near each end thereof, a wheel fork pivoted to each clamp so as to be movable about a pivot parallel with the axis of the axle housing, a wheel rotatably secured to each fork, a shaft having one end slidably and rotatably secured to the axle housing, the other end being slidably and rotatably secured to a bearing connected with the engine, means for rotating the shaft when the engine rotates, a sprocket wheel secured to each wheel, two sprocket wheels slidably and rotatably secured to the shaft, means for connecting either one of said last named sprocket wheels with the shaft so that it will be rotated thereby and a sprocket chain enclosing the sprocket wheels on the wheels and cooperating with the sprocket wheels on the shaft.

In testimony whereof I affix my signature.

HARVEY H. HALL.